United States Patent [19]
Enter et al.

[11] Patent Number: 4,520,270
[45] Date of Patent: May 28, 1985

[54] SELF-ADJUSTING SENSOR CONTROLLER

[75] Inventors: Rudolf Enter, Kitchener; Michael P. Laverty, Waterloo, both of Canada

[73] Assignee: NCR Canada Ltd - NCR Canada Ltee, Mississauga, Canada

[21] Appl. No.: 431,922

[22] Filed: Sep. 30, 1982

[51] Int. Cl.³ .............................................. G01H 21/86
[52] U.S. Cl. ..................................... 250/560; 356/386
[58] Field of Search ........... 250/560, 568, 571, 214 R, 250/214 B, 556, 558, 559, 204, 206; 382/48, 63; 356/384–387

[56] References Cited

U.S. PATENT DOCUMENTS 4,013,999  3/1977  Erwin et al. ........................... 382/48
4,173,788  11/1979  Laliotis ................................. 250/560
4,254,469  3/1981  Whitely ................................. 364/571
4,318,082  3/1982  King ..................................... 250/204

Primary Examiner—David C. Nelms
Assistant Examiner—James Gatto
Attorney, Agent, or Firm—Albert L. Sessler, Jr.; Elmer Wargo

[57] ABSTRACT

A circuit for adjusting the sensitivity of a sensor which is used typically in document handling equipment is disclosed. A special application of the circuit relates to using a plurality of the sensors in a height-determining operation which is used in conjunction with an imaging device, which scans or images the front, for example, of a document. The height of the particular document being scanned by the imaging device is used to "scan" only as far as the height of the document so as to eliminate meaningless data from the image of the document.

7 Claims, 4 Drawing Figures

SELF-ADJUSTING SENSOR CONTROLLER

BACKGROUND OF THE INVENTION

This invention relates to a circuit for adjusting to the sensitivity of a sensor, of the type which generally is used in various paper or document handling equipment, for example, and it also relates to a special application of the circuit in which a plurality of such sensors is used in a height-determining operation in conjunction with an imaging device.

The most common type of "sensor" used currently in document-handling equipment consists of an optically-coupled, light-emitting diode/phototransistor pair. When the "pairs" are "unselected", i.e., selected at random, two such pairs can exhibit a sensitivity range of about two orders of magnitude or more. A common solution to this problem is to match the light emitting diode (LED) and the associated phototransistor or photodetector in pairs in order to achieve a desired sensitivity range. Final adjustment of the sensitivity is done by adjusting the current to the LED of an associated pair. This adjustment increases the cost of the sensor and complicates its maintenance because the LED and its associated phototransistor must be replaced in "pairs".

Another problem with sensors used in document-handling equipment is that the light-transmitting qualities of the associated documents may range from being near opaque to being almost transparent. Naturally, this limits the maximum sensitivity of the detector in the "pair" that can be used in an application.

Dust accumulating on the sensor is a third problem which is common with the equipment discussed. The accumulation of dust can eventually reach a level at which the dust cannot be distinguished from a document, and consequently, the sensor becomes useless.

Also, the sensitivity of the photodetector changes with age.

SUMMARY OF THE INVENTION

The circuit of this invention overcomes the problems mentioned. The circuit comprises a sensor controller having means for selecting said source of light to be energized to provide a light coupling relationship with an associated photodetector; said photodetector having a terminal at which an unblocked or an open-condition voltage is developed for an open condition i.e. when no object is between said photodetector and said source of light and at which a blocked-condition voltage is developed for a blocked condition, i.e. when an object is between said photodetector and said source of light; a comparator having inverting and non-inverting inputs thereto and an output therefrom and means for coupling said inverting input to said terminal; a digital to analog converter having its input coupled to said sensor controller and its output coupled to said non-inverting input of said comparator; said sensor controller having means for ascertaining said open-condition voltage in cooperation with said comparator and said converter, said sensor controller also having a memory in which a test value is stored; said test value corresponding to a predetermined fraction of said open-condition voltage; and said sensor controller issuing said test value to said D/A converter which supplies a corresponding voltage to said non-inverting input of said comparator to enable said comparator to generate first and second signals corresponding to said open condition and to said blocked condition, respectively, with respect to said photodetector.

The circuit is also used in an apparatus comprising a plurality of photodetectors arranged in a dimension-detecting direction and a source of light for each said photodetector, which said source of light is positioned for light coupling relationship with its associated said photodetector when the associated source of light is energized; and a circuit for adjusting to the sensitivity of each said photodetector and for determining a dimension of an object positioned between said photodetectors and said sources of light and as measured along said dimension-detecting direction comprising: a sensor controller having means for selecting a said source of light to be energized to provide a light coupling relationship with the associated said photodetector; each said photodetector having a terminal at which an unblocked or an open-condition voltage is developed for an open condition, i.e. when no object is between said photodetector and the associated said source of light and at which a blocked-condition voltage is developed for a blocked condition, i.e. when an object is between a said photodetector and the associated said source of light; a comparator having inverting and non-inverting inputs thereto and an output therefrom and means for coupling said inverting input to said terminal of each said photodetector; a digital to analog converter having its input coupled to said sensor controller and its output coupled to said non-inverting input of said comparator; said sensor controller having means for ascertaining said open condition voltage for each said photodetector in cooperation with said selecting means, said comparator and said converter; said sensor controller also having a memory in which a test value for each said photodetector is stored; said test value corresponding to a predetermined fraction of said open-condition voltage for the associated said photodetector; said sensor controller in cooperation with said selecting means, issuing sequentially a said test value to said converter which supplies a corresponding voltage to said non-inverting input of said comparator to enable said comparator to generate first and second signals corresponding to said open condition and to said blocked condition, respectively, for each said photodetector in said plurality of photodetectors, with the number of said photodetectors in said blocked condition being a measure of said selected dimension of said object.

In addition to overcoming the various problems mentioned with regard to prior art devices, the circuit of this invention lends itself particularly well to applications in which:

(1) a microprocessor controller is used; and (2) multiple sensors must be sampled.

The self-adjusting feature of the sensors or photodetectors involved permits the most economical sensors to be used.

These advantages and others will be more readily understood in connection with the following specification, claims and drawing.

DETAILED DESCRIPTION OF THE INVENTION

Figure 1:
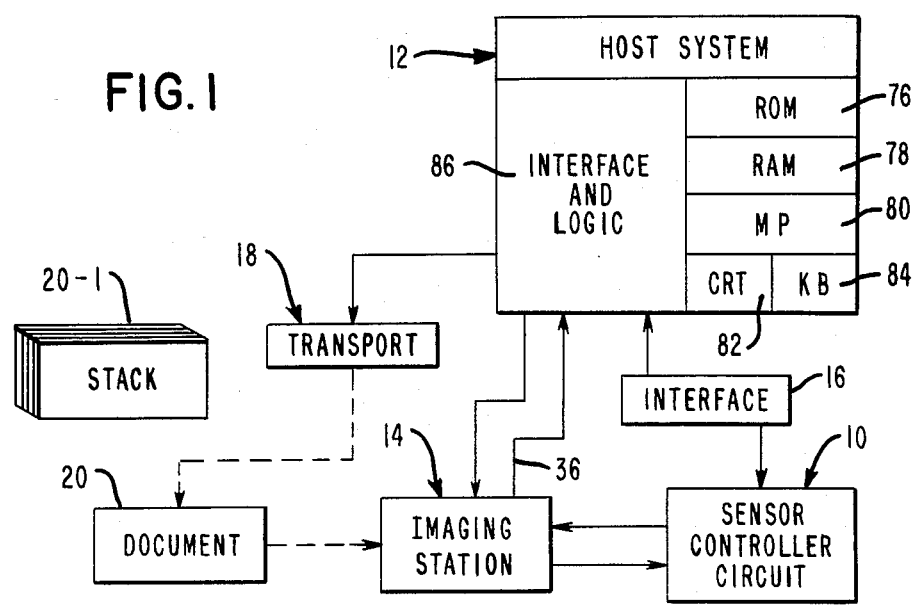
FIG. 1 is a schematic diagram, in block form, showing an environment in which the circuit of this invention may be used.
Figure 4:
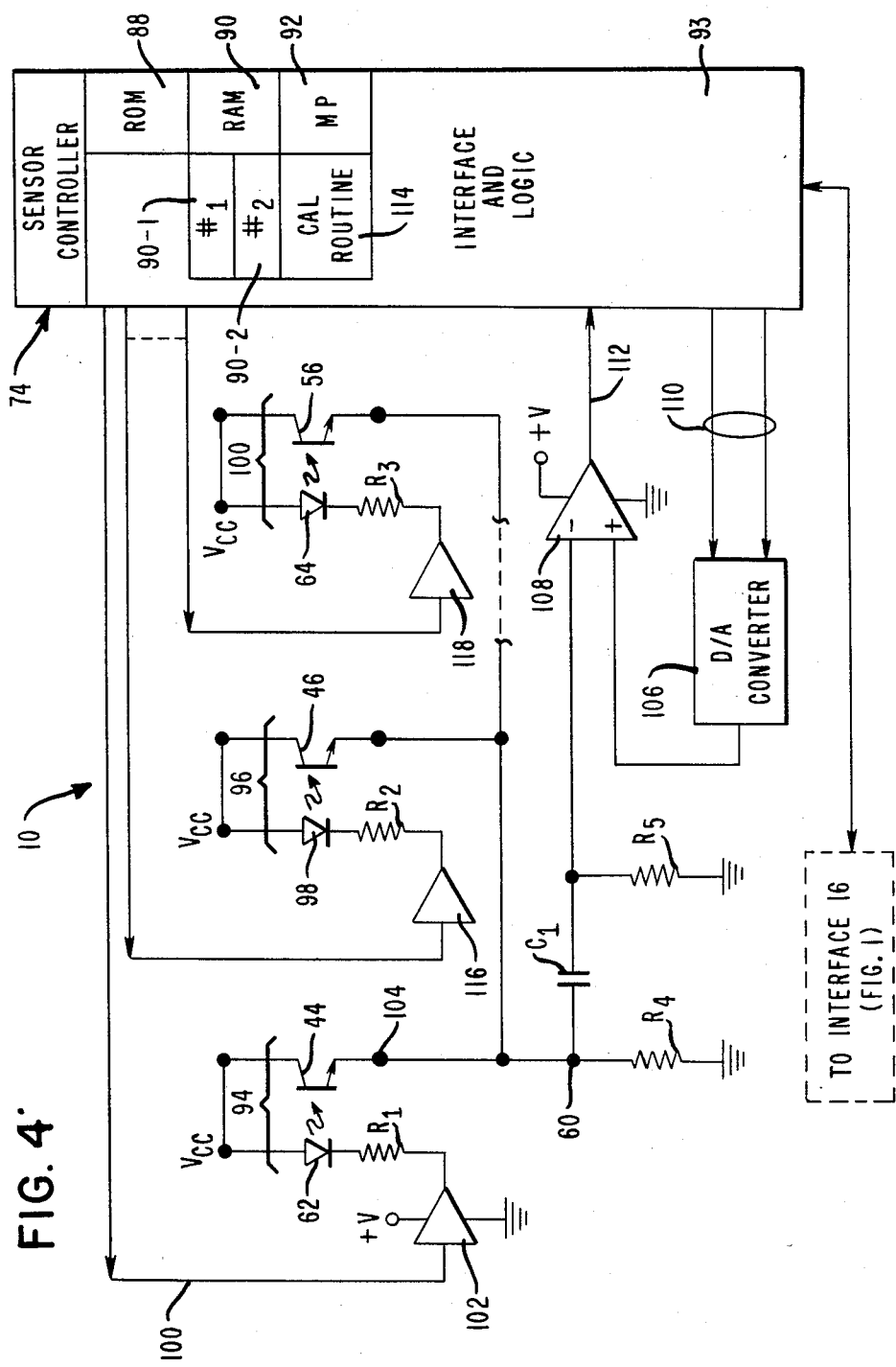
FIG. 4 is a schematic diagram of the sensor controller circuit shown in FIG. 1.

FIG. 1 is a schematic diagram, in block form, showing an environment in which the sensor controller circuit 10 of this invention may be used, with the circuit 10 being shown in more detail in FIG. 4. As stated earlier herein, the circuit 10 is useful in adjusting to the sensitivity of a photodetector which may be used, for example, in document handling equipment, and a special application of the circuit 10 is used in an environment in which a dimension such as the height of a document is to be determined.

The environment shown in FIG. 1 represents a system in which imaging of a document is performed as part of a banking operation, for example. The environment includes a host system 12, an imaging station 14, an interface 16, and a transport mechanism 18 which conventionally moves each document 20, for example, of a stack 20-1 of documents in reading or imaging relationship with the imaging station 14.

In one such known banking system, a digitized image of a document such as a check, for example, is obtained at an imaging station, and this digitized image is used in processing data about the check, at least for some banking operations. One of the problems associated with this banking system is that the documents such as checks and deposit slips, for example, are not of one standard size, and a batch of checks like 20-1 usually contains a variety of sizes. If the entire side of a document is to be digitized at an imaging station like 14, and if the documents come in a variety of sizes, it follows that the imaging station 14 must be designed to process a range of documents from the smallest to the largest sizes anticipated.

Figure 2:
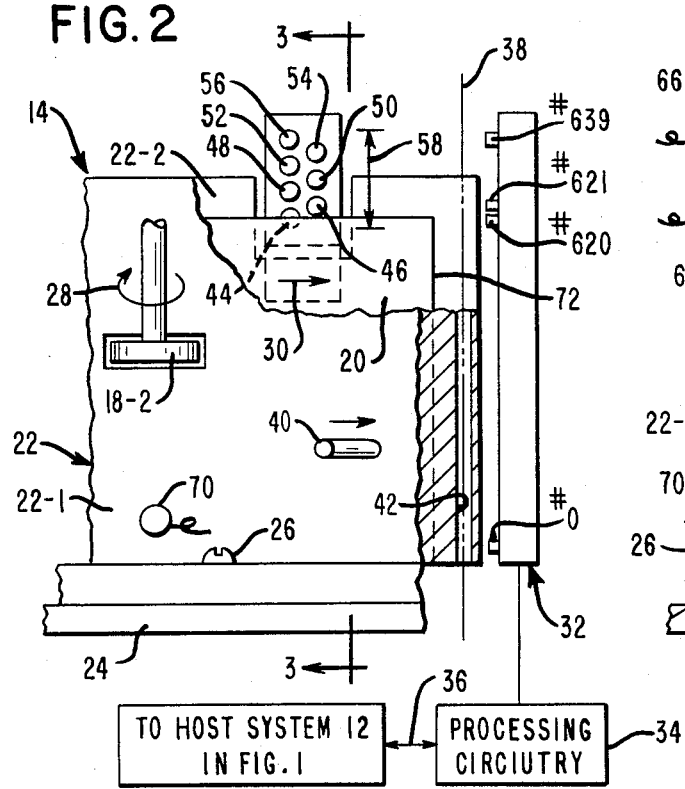
FIG. 2 is a side view, shown in diagrammatic form, to illustrate the imaging station shown in FIG. 1.
Figure 3:
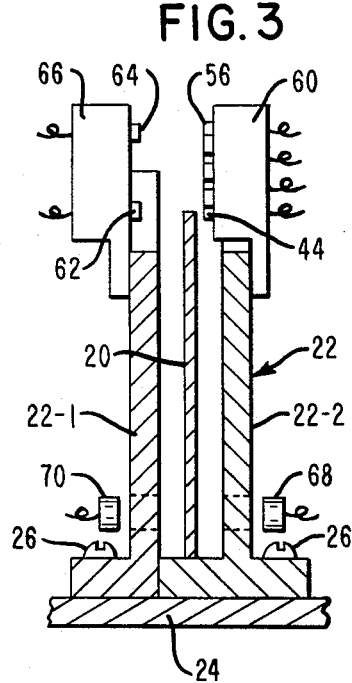
FIG. 3 is an end view, taken along the general line 3—3 of FIG. 2, to show the relationship of several pairs of LEDs and their associated phototransistors or photodetectors to a document passing the imaging station shown in FIGS. 1 and 2.

One such imaging station 14 is shown in more detail in FIGS. 2 and 3. In the embodiment described, the document 20 is moved in a track 22 consisting of side walls 22-1 and 22-2 which are upstanding from and secured to a horizontal support plate 24 by fasteners 26. The transport mechanism 18 (FIG. 1) is represented by a drive wheel 18-2 in FIG. 2 and is rotated in the direction of arrow 28 so as to move the document 20 in a downstream direction (as shown by arrow 30) within the track 22, in imaging relationship with an imaging device 32.

The imaging device 32 (FIG. 2) is conventional, such as a standard charge-coupled device or imaging array such as the Fairchild Charge Coupled Device CCD 133 which is manufactured by Fairchild Corporation. The general function of the imaging device 32 along with its conventional processing circuitry 34 is to scan the document 20 and produce a digitized image thereof, with the output of the processing circuitry 34 being a serial stream of digitized data, which represents a gray scale resolution of the image of the check 20. The stream of digitized data is forwarded to the host system 12 over the line 36.

The imaging device 32 (FIG. 2) is exaggerated in size (i.e. made larger) to illustrate the light responsive members such as #0, #620, #621, and #639 which are rotated from their true position to facilitate a showing of their function, i.e. the light responsive members #0, #620, etc. actually face the document 20. In the embodiment described, there are 640 light responsive members in the imaging device; however, only a few members are shown spaced along the height of the device 32 as viewed in FIG. 2. The light responsive members like #0, #620, for example, produce picture elements or pixels as the document 20 is moved past a scanning line 38 by the transport drive wheel 18-2 at a velocity of about 600–700 millimeters per second in the embodiment described. Light from a source such as light pipes 40 passes through a slot 42 in the track side wall 22-1 and is used to illuminate the document 20 along the scanning line 38, and the light reflected from the document 20 passes through a lens system (not shown) to the light responsive members #0–#639 of the scanning device 32 to produce the digitized stream of data mentioned.

The particular application of the sensor controller circuit 10 used to portray this invention is shown best in FIGS. 2 and 3. The imaging station 14 includes a plurality of photodetectors 44, 46, 48, 50, 52, 54 and 56 which are "offset or nested" to position more photodetectors in a dimension-detection direction represented by the double-arrow line 58, which in this application is used to represent the height of a document 20. In the embodiment described, the variation in height of a document 20 is expected to be about one inch. The individual photodetectors like 44–56 may be mounted in a support 60 which is secured to the side wall 22-2, and they are located upstream from the scanning line 38. For each photodetector 44–56, there is provided an associated light source like 62 and 64, for example, which are shown in FIG. 3 in opposed relationship with photodetectors 44 and 56, respectively. When light from a particular light source like 62, for example, is blocked by a document 20 passing between it and the associated photodetector 44, it means that the document 20 is at least that high, as measured along the direction of arrow 58. By noting which of the photodetectors 44–56 indicate a blocked condition and which of the photodetectors is the first to be in an unblocked or open condition, for example, the height of the document 20 is obtained.

The status of the photodetectors 44–56 (i.e. representing the height of a document 20) is used by the host system 12 to decide how much of the data from the imaging device 32 to eliminate as useless data. For example, in the particular situation depicted in FIG. 2, the light responsive member #620 of the imaging device 32 is the last one to receive image data about the document 20, as this member #620 includes the top edge of the document. Light responsive members #621–#639, however, do not include any image data from the document, and accordingly, the outputs from the members #621–#639 are eliminated. This elimination of useless data improves the processing time of the imaging station 14 and reduces memory requirements in the host system 12; these are important features, especially when processing is done on a real time basis.

In the embodiment described, the light sources 62, 64 are light emitting diodes (LED's), and the photodetectors 44–60 are discrete, infra-red, interruptor-type sensor such as TIL32IR emitters and TIL78 phototransistors, respectively, which are manufactured by Texas Instruments, for example. Naturally, the particular types of light sources and sensors or photodetectors mentioned are merely illustrative, and the specific ones selected depend upon a particular application. The light sources 62, 64 are shown mounted on a support 66

(FIG. 3) which is secured to the sidewall 22-1 of the track 22. The portraying of the light sources 62, 64 and the photodetectors 44-60 shown in FIGS. 2 and 3 is simply functional, and their actual shapes and sizes would be dependent upon the particular combinations of light sources and detectors selected for a particular application. The imaging station 14 has a sensor such as sensor 68 (FIG. 3) and its associated light source 70 to indicate the presence of a document at the imaging station 14, and the station also has other sensors (not shown) to indicate the location of a leading edge 72 of a document 20 with respect to the scanning line 38.

The data coming from the imaging device 32 is processed conventionally by the processing circuitry 34 (FIG. 2) and is forwarded to the host system 12. The host system 12 is conventional and includes a read only memory (ROM) 76, a random access memory (RAM) 78, a processor (MP) 80, a cathode ray tube display (CRT) 82 for communicating with an operator, a keyboard (KB) 84, and interface and logic 86, all of which cooperate conventionally with the transport mechanism 18, imaging station 14, and sensor controller circuit 10 (via interface 16) to provide conventional control thereover. Because this aspect is conventional, it need not be described more fully.

The sensor controller circuit 10 which cooperates with the imaging station 14 is shown in more detail in FIG. 4. The circuit 10 includes a sensor controller designated generally as 74. The sensor controller 74 includes a ROM 88, a RAM 90, a processor MP 92, and an interface and logic 94. The ROM 88 contains the instructions or operations to be performed by the circuit 10, the RAM 90 is used for temporary storage of data, the MP 92 is used to execute the various operations, and the interface and logic 93 provide the various interfaces to be described.

The circuit 10 (FIG. 4) includes the various light sources like 62 and their corresponding photodetectors (like 44 associated with light source 62) already described in relation to FIGS. 2 and 3, and these elements form sensor pairs like sensor pair 94 as shown in FIG. 4. A sensor pair 96 including the source of light 98 and the photodetector 46 form the second sensor pair, and the sensor pair 100 in FIG. 4 includes the source of light 64 and the associated photodetector 56. Because all these sensor pairs like 94 and 96 are alike, a discussion of only the sensor pair 94 will be presented.

Each sensor pair like 94 (FIG. 4) has its own select line 100 which is used by the sensor controller 74 to select or energize the light source 62 associated with the photodetector 44 in the sensor pair. In the embodiment described, when the light source like 62 is selected, it stays on long enough, i.e. about 50-500 microseconds in the embodiment described, to enable the sensitivity adjustment to be made as will be described hereinafter.

The light source 62 (FIG. 4) is an LED in the embodiment described, and it has its anode connected to a $V_{CC}$ source of potential and its cathode connected to the output of a buffer 102 which functions as a switch for the light source 62. The buffer 102 is a standard integrated circuit or TTL chip like 7406 or 7407, each one of which is manufactured by Texas Instruments, for example. The buffer 102 is provided with a source of potential (+V); it receives the select output from the sensor controller 74 on the line 100; and it is also connected to ground as shown. When an energizing signal appears on line 100, for example, the light source 62 is connected to ground via the current limiting resistor $R_1$ and the now-conditioned buffer 102. When the source of light 62 is energized, it causes a current to flow through the associated photodetector 44, and an unblocked or open-condition voltage is generated at terminal 104 and at common terminal 60 where, a suitable resistor $R_4$, which functions as a common load resistor, connects the terminal 60 to ground. The photodetector 44 is a type which produces a lower voltage at terminal 104 (and terminal 60) when a blocked condition occurs; that occurs when an object like a document 20 blocks the light to the photodetector 44. In the circuit 10, it is the open condition voltage which is used to adjust to the sensitivity of the various photodetectors, like 44.

Before the photodetectors 44-56 (FIG. 2) are used in the height-determining operation mentioned, these photodetectors are calibrated. Therefore, at the start of each operating day, at power up, or at other times designated by the host system 12, for example, a signal will be sent from the host system 12 to the sensor controller 74 (via the interface 16) to initiate a calibration procedure which enables the circuit 10 to adjust to the sensitivity of each of the photodetectors included in a sensor pair like 94. In this regard, open-circuit voltage at terminal 104, for example, (FIG. 4) is determined in association with the sensor controller 74, a conventional digital to analog (D/A) converter 106, and a conventional comparator 108. The comparator 108 has an inverting input (−), a non-inverting (+), and an output (line 112) associated therewith. The D/A converter receives coded outputs from the sensor controller 74 over eight lines shown collectively as 110, and converts these coded outputs into a corresponding voltage which is fed into the non-inverting input of the comparator 108. A conventional calibration routine 114, located in the ROM 88, is used to perform the calibration procedure to be described.

As previously stated, the sensor controller 74 (FIG. 4) will select one of the light sources like 62 to be energized, and an open-condition voltage is developed at terminal 104 and at common terminal 60 as previously described. The means for connecting or coupling the terminal 104 to the inverting input (−) of the comparator 108 includes a capacitor $C_1$ which effectively removes the effects of the leakage currents associated with the photodetectors or the ambient light-induced currents which cause large offset voltages to be developed across resistor $R_4$. The capacitor $C_1$ is connected between the common terminal 60 and the inverting (−) input of the comparator 108.

Assuming that the open-condition voltage at terminal 104 and at terminal 60 (FIG. 4) is 1.1 volts and that the eight lines 110 (which are the control lines) are arranged in the order of 2 volts, 1 volt, ½ volt, ¼ volt, ⅛ volt (0.125), 1/16 volt (0.0625) etc., the calibration routine 114 in association with the MP 92 will initially place a signal on only the 2 volt line causing the D/A converter 106 to issue 2 volts to the non-inverting input (+) of the comparator 108. Because the (+) input (2.0 volts) is higher than the (−) input (1.1 volts), the output on line 112 will be high, causing the calibration routine 114 (via the interface and logic 93) to thereafter initiate a code on lines 110 (by energizing only the 1 volt line) causing the D/A converter 106 to issue 1 volt to the (+) input of the converter 108. Because the (+) input (1 volt) is lower than the (−) input (1.1 volts), the output on line 112 will be low causing the routine 114 to initiate another output to the D/A converter 106. This iterative or successive approximation continues as described until the converter 108 "toggles" between 1.109 volts and 1.094 volts, thereby recognizing that the 1.1 volts on the (−) input to the comparator 108 lies therebetween in the example described. The open-condition voltage for the photodetector 44 may then be taken as either 1.109 volts or 1.094 volts which collectively represent the two toggle voltages. In the embodiment described, the upper level was selected as the open-condition voltage, and a value representing this voltage may be stored in an area #1 (marked 90-1 of RAM 90). This process of determining the open-condition voltage is repeated for each of the photodetectors 44–56.

While the unblocked or open-condition voltage of a photodetector like 44 may be a relatively fixed value at a certain time, the blocked-condition voltage may vary depending upon the varying degrees of opacity or translucency of the documents passing between the light source and the associated photodetector. From experimentation with the various types of documents 20 described, it was found that by reducing the open-condition voltage by a predetermined factor of 2, a suitable threshold voltage could be obtained at the comparator 108 for testing for a blocked-condition voltage. In the example described, assuming that the upper level, i.e., 1.109 volts in the example described, is selected as the open-condition voltage for photodetector 44, a test value representing half this amount or 0.55 volts is stored in a memory location #2 (90-2) in RAM 90. When the sensor controller 74 wishes to examine the status of photodetector 44, the corresponding test value (0.55 volts) is obtained from memory location #2 (90-2) and forwarded over lines 110 to the D/A converter 106 which places 0.55 volts on the (+) input of the comparator 108. If an open condition exists at photodetector 44, the comparator 108 will issue a low level signal indicating such a state. If a blocked condition exists at photodetector 44, the value at its terminal 104 and the (−) input of comparator 108 will be less than the 0.55 volts at the (+) input of comparator 108, causing the comparator 108 to issue a high level signal or blocked condition on line 112. The sensor controller 74 will then repeat this process for the next photodetector 46 by initially selecting the associated test value from memory location #2 which represents ½ its open-condition voltage in the example being described, and the next photodetector like 46 is selectively energized.

This process of obtaining the status of each of the photodetectors 44–56 (FIG. 4) is repeated, and the status of each of these photodetectors i.e., blocked or not blocked, is examined to thereby determine the height of the document 20 at the imaging station 14. A conventional routine, stored in the ROM 88, for example, may be used to effect the evaluation mentioned. The routine, for example, may begin the search for the height of a document by examining the status of the topmost photodetector 56 (FIG. 3) and thereafter working towards photodetector 44. The height of the document 20 is then forwarded to the host system 12 (FIG. 1) via the interface 16, and the host system 12 for example, may issue an instruction to the processing circuitry 34 to ignore the data from light responsive members which are located above the top of a document; in the example shown in FIG. 2, the light responsive members #621–#639 would not contain pertinent data as previously described.

The photodetectors 44–56 (FIG. 2) are located sufficiently far upstream from the scanning line 38 to permit the height-determining function to be completed prior to the leading edge 72 of the document 20 reaching the scanning line 38. The output from the sensor 68 (FIG. 3) (blocked or not blocked) is forwarded to the host system 12 to verify that a document like 20 is present during the height-determining operation described.

The ROM 88 of the sensor controller 74 (FIG. 4) may also contain a conventional routine which examines potential errors in the height-determining operation. For example, if photodetector 50 (FIG. 2) indicates an open-condition voltage, and the next lower photodetector 48 and the next higher photodetectors 52 and 54 both indicate blocked condition voltages when a document 20 is present, it most likely means that photodetector 50 is defective. An error message reporting this condition is forwarded to the host system 12 which displays it on the CRT 82. The host system 12 can then make a decision to request "repair" of the photodetector 50 or recalibration thereof, or it can ignore the output from photodetector 50 and operate in a degraded mode. If a photodetector like 50 always indicates a blocked-condition voltage when one or more photodetectors "below" it properly record an open-condition voltage, it may mean that the photodetector has accumulated excessive dirt thereon and needs to be cleaned.

Some additional miscellaneous comments appear necessary. Naturally, more or fewer than the number of photodetectors 44–56 shown may be used. The buffers 116 and 118 shown in FIG. 4 are identical to buffer 102 already described. In the embodiment described, resistors $R_1$, $R_2$, and $R_3$ are identical and equal 120 ohms. Capacitor $C_1$ equals 0.1 $\mu F$. Resistor $R_4$ equals 680 ohms. Resistor $R_5$ equals 100 K ohms.

We claim:

1. A circuit comprising:
a source light and a photodetector which are positioned relative to each other to function as a light-detector pair;
a sensor controller having means for selecting said source of light to energize it to provide a light coupling relationship with said photodetector; said photodetector having a terminal at which an open-condition voltage is developed for an open condition i.e. when no object is between said photodetector and said source of light and at which a blocked-condition voltage is developed for a blocked condition i.e. when an object is between said photodetector and said source of light;
a comparator having inverting and non-inverting inputs thereto and an output therefrom and means for coupling said inverting input to said terminal;
a digital to analog converter having its input coupled to said sensor controller and its output coupled to said non-inverting input of said comparator;
said sensor controller having means for ascertaining said open condition voltage in cooperation with said comparator and said converter, said sensor controller also having a memory in which a test value is stored; said test value corresponding to a predetermined fraction of said open-condition voltage; and said sensor controller issuing said test value to said D/A converter which supplies a corresponding voltage to said non-inverting input of said comparator to enable said comparator to generate first and second signals corresponding to said open condition and to said blocked condition, respectively, with respect to said photodetector.

2. The circuit as claimed in claim 1 in which said coupling means includes a capacitor.

3. The circuit as claimed in claim 2 in which said source of light is a light emitting diode and said photodetector is of an infra red interruptor type.

4. An apparatus comprising:
- a plurality of photodetectors arranged in a dimension-detecting direction with reference to a selected dimension of an object, and a source of light for each said photodetector, which said source of light is positioned for light coupling relationship with its associated said photodetector when the associated source of light is energized to enable said source of light and associated said photodetector to function as a light-detector pair; and
- a circuit for adjusting to the sensitivity of each said photodetector and for determining said selected dimension of an object positioned between said photodetectors and said sources of light and as measured along said dimension-detecting direction, comprising:
- a sensor controller having means for selecting a said source of light to be energized to provide a light-coupling relationship with the associated said photodetector; each said photodetector having a terminal at which an open-condition voltage is developed for an open condition i.e. when no object is between said photodetector and the associated said source of light and at which a blocked condition voltage is developed for a blocked condition i.e. when an object is between a said photodetector and the associated said source of light;
- a comparator having inverting and noninverting inputs thereto and an output therefrom and means for coupling said inverting input to said terminal of each said photodetector;
- a digital to analog converter having its input coupled to said sensor controller and its output coupled to said non-inverting input of said comparator;
- said sensor controller having means for ascertaining said open-condition voltage for each said photodetector in cooperation with said selecting means, said comparator and said converter; said sensor controller also having a memory in which a test value is stored for each said photodetector; each said test value corresponding to a predetermined fraction of said open condition voltage for the associated said photodetector;
- said sensor controller in cooperation with said selected means, issuing sequentially a said test value to said converter which supplies a corresponding voltage to said non-inverting input of said comparator to enable said comparator to generate first and second signals corresponding to said open condition and to said blocked condition, respectively, for each said photodetector in said plurality of photodetectors, with the number of said photodetectors in said blocked condition being a measure of said selected dimension of said object.

5. The apparatus as claimed in claim 4 in which said coupling means includes a capacitor coupled between the terminal of each said photodetector and said inverting input of said comparator.

6. The apparatus as claimed in claim 4 in which each said source of light is a light-emitting diode and each said photodetector is of an infra-red phototransistor type.

7. The apparatus as claimed in claim 4 in which said object is a document and in which said apparatus also includes a means for developing an image of said document, said developing means being capable of developing an image along said selected dimension, and said number of said photodetectors in said blocked condition being used by said imaging means to ascertain how far along said selected dimension said developing means is to develop said image.

* * * * *